United States Patent [19]
Snell et al.

[11] Patent Number: 5,926,918
[45] Date of Patent: Jul. 27, 1999

[54] APPARATUS AND METHOD FOR OPENING AND FOR RECLAIMING FIBERS

[76] Inventors: William Seaborn Snell, 221 Heathwood Place, Easley, S.C. 26940; Robert K. Vance, 275 Styles Rd., Taylors, S.C. 29687

[21] Appl. No.: 09/083,321

[22] Filed: May 22, 1998

[51] Int. Cl.⁶ .............................. D01B 3/04; D01B 1/00; D01G 15/00; B02C 1/08
[52] U.S. Cl. .............................. 19/65 R; 19/66 R; 19/98; 19/99; 19/107; 19/105; 19/106 R; 19/97.5; 241/280
[58] Field of Search .................................. 19/65 R, 66 R, 19/200, 202, 203, 204, 205, 98, 99, 107, 65 A, 161.1, 161.3, 161.58, 105, 106 R, 97.5, 82; 241/280, 281

[56] References Cited

U.S. PATENT DOCUMENTS

| 3,169,278 | 2/1965 | Aoki | 19/105 |
|---|---|---|---|
| 3,955,244 | 5/1976 | Jenkins, Jr. | 19/107 |
| 4,157,601 | 6/1979 | Elliott | 19/107 |
| 4,472,859 | 9/1984 | Elliott et al. | 19/105 |
| 4,484,377 | 11/1984 | Morel | 19/82 |
| 4,524,492 | 6/1985 | Elliott | 19/107 |
| 5,257,831 | 11/1993 | Garcia | 19/82 |

*Primary Examiner*—John J. Calvert
*Assistant Examiner*—Gary L. Welch
*Attorney, Agent, or Firm*—Ralph Bailey, P.A.

[57] ABSTRACT

A driven opening roll (A) covered with card clothing receives a web (W) over a feed plate (B) which carries a pair of serially arranged feed rolls (C) and (D) for separating fibrous material from the web and removing the fibrous material in a passageway (E) providing air flow progressively increasing in velocity.

30 Claims, 7 Drawing Sheets

APPARATUS AND METHOD FOR OPENING AND FOR RECLAIMING FIBERS

BACKGROUND OF THE INVENTION

This invention relates to improved feeding and air flow apparatus and method for opening fibers.

A need for a reliable device to reclaim unsalable fibrous materials has persisted for many years. Unsalable materials include, but are not limited to, selvedge trims, startup rolls, defective product, test samples and production overruns. The invention especially concerns the reduction of finished material back to individual fibers that may be reintroduced into the production process. The subject apparatus and method efficiently and consistently process a wide variety of fabrics and fibers. While the fabrics to which the device is most applicable include nonwovens, other fabrics and fiber masses and configurations, natural and synthetic may also be processed.

Nonwoven fabrics are distinguished from woven or knitted fabrics in several ways. Nonwovens usually consist of layers of fibers laid randomly with respect to one another. The individual fibers are formed into fabric by mechanical interlocking or chemical bonding, or a combination of both methods. Woven and knitted fabrics are usually constructed of fiber that has been spun into yarn, which is subsequently woven or knitted together in a uniform and precise manner. Nonwovens, due to their random nature and looser construction, are generally easier to reduce back to individual fibers. It is with both mechanically and chemically bonded nonwovens that the invention as presently contemplated is thought to offer its greatest advantage.

The prior art includes fiber reclaiming constructions and methods illustrated in U.S. Pat. Nos. 4,484,377 and 5,257,831 wherein waste that is only partially or insufficiently processed is returned to the input in multi-stage machines. The prior art is further exemplified by U.S. Pat. Nos. 3,169,278, 3,955,244, 4,157,601, 4,472,859, and 4,524,492 relating to air flow constructions useful in carding machines.

SUMMARY OF THE INVENTION

Accordingly, it is an important object of this invention to provide an improved fiber or web feeding apparatus and method wherein the control characteristics for incoming stock may be enhanced through the addition of a serially arranged feeding zone exerting a retarding force upon fibers being fed by a feed roll over a feed plate to an opening roll.

Another important object of the invention is the provision of apparatus and method for avoiding clogging of the apparatus by improving the air flow characteristics through the use of an air passageway of diminishing cross section so as to provide increased velocity of air flow toward a lower portion of the opening roll prior to discharge of the reclaimed fiber for reuse.

Another important object of the invention is to provide an improved feed plate having milled or otherwise formed grooves or troughs opposite serially arranged feed rolls for increasing the surface area of fiber engagement to enhance control over the incoming fibers.

Another important object of the invention is to provide an improved mounting for carrying the feed rolls on a feed plate including mounting plates and anti-friction devices such as bushings or bearings with adjusting screw threaded members for providing individual adjustment at right angles to serially arranged feed rolls in order to provide proper settings as in relation to the opposing grooves or troughs in the feed plate to control the incoming fibers to accommodate machine characteristics and speeds consistent with adjustment of the feed plate to optimize the feeding of fibers to an opening roll preferably equipped with card clothing calculated to provide a sufficient shredding and opening action as required for the particular material being processed.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

The drawings illustrate an apparatus for reclaiming fibers from a textile web having a driven opening roll A covered with card clothing. A feed plate B receives the textile web opposite a pair of in line longitudinally spaced feed rolls C and D extending transversely of the feed plate for delivering the textile web across the feed plate to the opening roll for opening fibers contained in the web. A passageway E beneath the opening roll varies in cross section providing air flow increasing in velocity with reduced air pressure controlling transport of opened fibers beneath the opening roll. The feed plate includes a transverse arcuate groove F opposite a first of the driven feed rolls designated at C, providing a surface complementary to a lower surface of the driven feed roll C for controlling the fibrous mass passing therebetween. Preferably a similar groove is machined in the feed plate opposite the feed roll D extending upwardly toward the nose of the feed plate. The passageway E beneath the opening roll is reduced in cross section from an air inlet. The passageway extends beneath the feed plate B to a lower portion of the opening roll A creating a high velocity low pressure air flow zone for removal of opened fibers from the opening roll. Apparatus for aiding in removal of opened fibers includes an air outlet extending outwardly from the air passageway for inducing air flow in the passageway adjacent to the lower portion of the opening roll. The air outlet preferably expands in cross section for transport of fibers removed from the opening roll.

Mounting apparatus for positioning transverse serially spaced feed rolls for transporting a web therebeneath over the feed plate includes a mounting assembly G carried adjacent each side of the feed plate. The mounting assembly G includes an adjustable mounting bracket with anti-friction device carrying opposite ends of the feed rolls respectively for rotation and for vertical and horizontal adjustment. The mounting assemblies further include threaded means carried adjacent the mounting brackets for effecting adjustments.

A method of opening fibers includes delivering a fibrous mass to a feeding zone wherein a force is exerted advancing fibers of the mass to a rotating opening roll A. By thereafter supporting the fibers of said mass on a feed plate B while advancing the fibers as by serially arranged feed rolls C and D and thereafter subjecting said fibers to the action of the rotating opening roll a separating action is achieved. A retarding force is exerted upon fibers of the mass against the force advancing fibers of the mass at a first feeding zone which includes feed roll C preceding said first mentioned feeding zone containing the feed roll D. Thereafter, the fibers are removed from a surface of the opening roll through air flow of increasing velocity in a passageway E which is progressively reduced in cross section toward a lower portion of the opening roll.

Feed

Incoming stock, in the form of a fibrous web W is introduced into the machine through the use of the driven feed rolls C and D. The web W may include fiber in any deliverable form including a carded web, fabric including nonwovens, carpet, woven or knitted fabrics, and mass of fibers as from a chute feed and the like. These rolls are illustrated as being wound with toothed, metallic clothing designed to penetrate and control the fabric although fluted rolls or other suitable rolls may be used. The first roll C may be considered to be a tension or retarding roll, while the second roll is considered to be a feed or transport roll. Both rolls are set in close proximity to the stationary control plate. The feed plate is milled to follow the radius of the rolls or otherwise generally to conform or be compatible with the opposing surface of the feed roll. Thus, the fabric is guided between the rolls and the plate. The amount of surface area and close settings between the toothed rolls and the plate is what develops the required holding or retaining force. Additional tension, and thus control, is developed by introducing a slight speed differential between the pair of rolls.

The fiber stock, which may still be in fabric form and now well controlled by the tension roll, is presented by the feed roll to the reclaim or opening roll A. The opening roll and its associated power train is what opens the fibers. The reclaim or opening roll, like the tension and feed rolls, is preferably wound with toothed metallic clothing but other suitable surfaces may be used. The opening roll is, however, much larger in diameter and is rotating at high speeds relative to the other rolls. The differences in size and speed between the opening roll and feed rolls create two useful effects: surface speed differential; and high rate of acceleration during fiber transfer.

These effects, combined with the aggressively toothed clothing on the reclaim roll, result in the efficient separation of individual fibers from the incoming stock. The reclaim roll must rotate at a velocity high enough to allow individual teeth to engage individual fibers in the incoming stock and accelerate them to the point at which they may be separated from the whole fabric without excessive speeds as would cause excessive fiber breakage.

Figure 6:
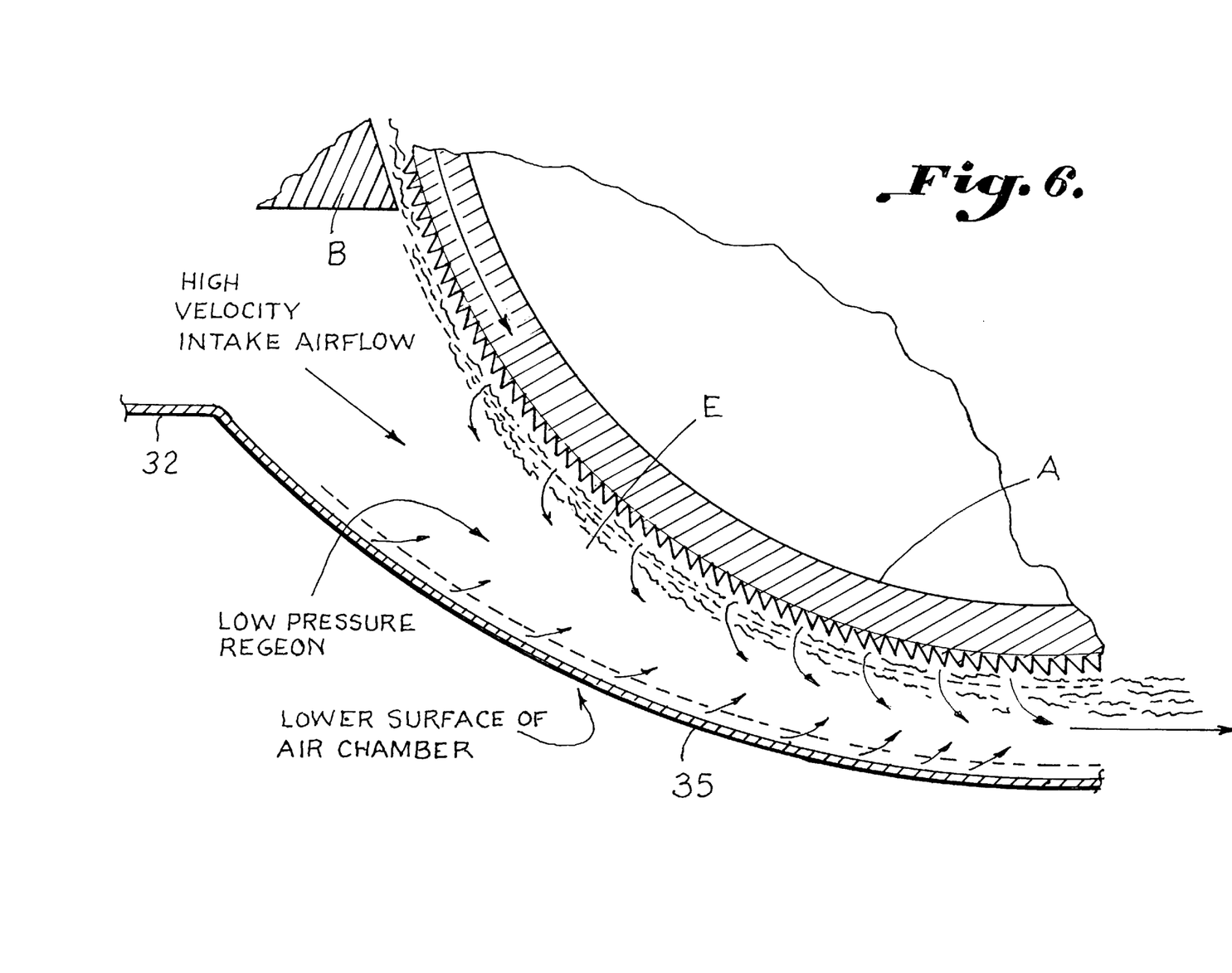
FIG. 6 is an enlarged transverse sectional elevation illustrating details of the air flow passageway providing for removal of the opened fibers from the opening roll while avoiding choking of the mechanism through the use of an air stream of increasing velocity provided by a screen and passageway of diminishing cross section from the feed to an area beneath the opening roll and thence increasing in cross section toward a fiber outlet.
Figure 7:
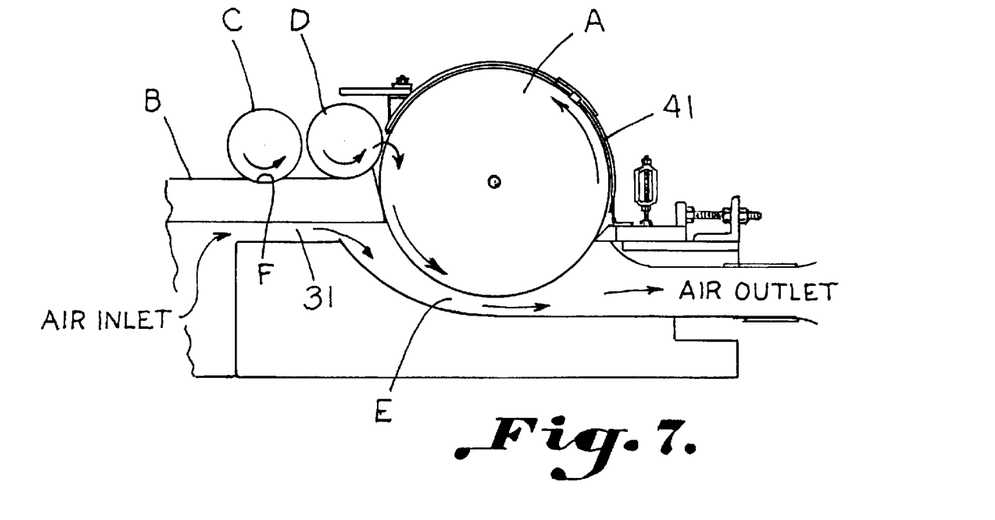
FIG. 7 is a schematic side elevation showing the air flow path from left to right increasing from the feed end to an area beneath the opening roll for exiting through an outlet.
Figure 8:
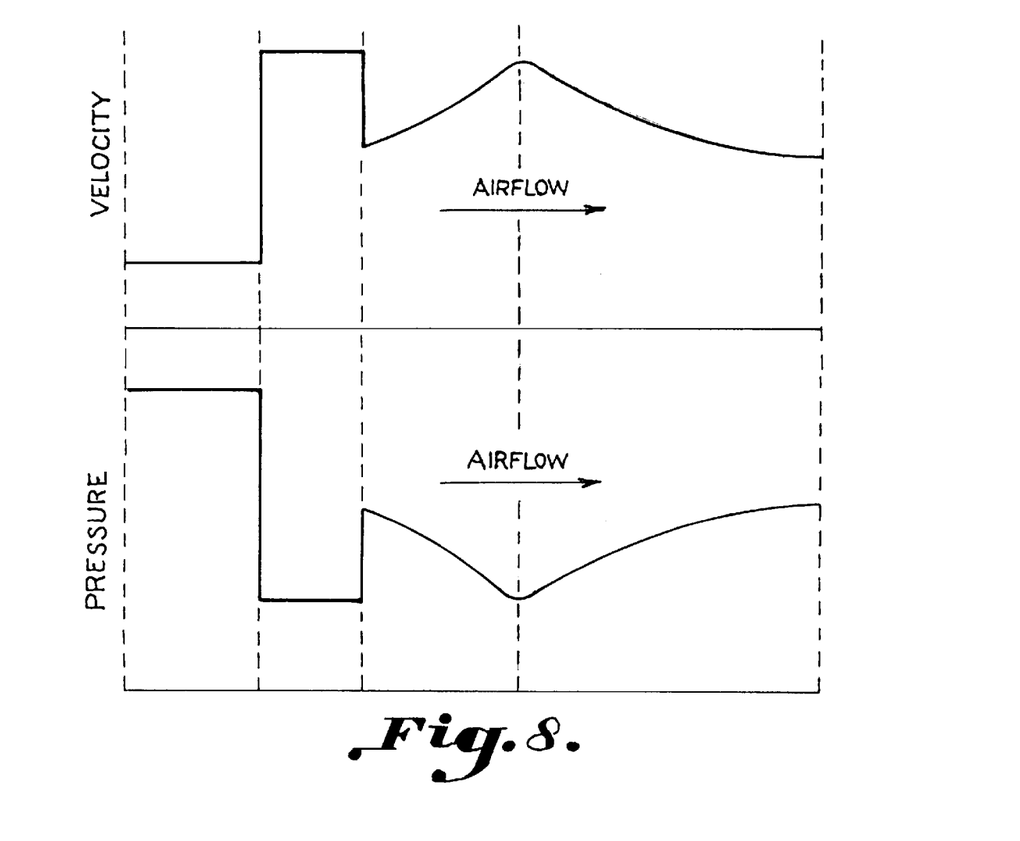
FIG. 8 is an air flow diagram, which has been idealized rather than based upon measurement, illustrating air flow characteristics with increased velocity beneath a feed plate through the fiber outlet from the machine such that air flow velocity continuously and uniformly increases in the cross section of the passageway from the feed plate is enlarged in the opening zone as the fiber passes over the nose of the feed plate. The air flow velocity increases while pressure decreases as the passageway is constricted toward the area beneath the opening roll. An air outlet for carrying opened fiber from the machine thereupon receives fiber from a passageway portion of expanded cross section.

Once separated, the individual fibers are transported away from the control plate by the teeth of the reclaim roll. As they are carried beneath the roll they are introduced into a high velocity, low pressure air stream. Differences in velocity and pressure cause individual fibers to transfer from the teeth to the air stream as illustrated in FIG. 6. The air stream then carries the individual fibers out of the machine into a duct system.

The feed system must be capable of introducing incoming fabric to the reclaim roll in a precise and fully controlled manner so as to afford the teeth of the reclaim roll the opportunity to separate individual fibers from the whole fabric.

The most common type of feed systems in prior use include stacked rolls or a single feed roll used in conjunction with a feed plate. The stacked roll arrangement lacks adequate control due to the geometry of the system because a length of unsupported fabric is produced before the reclaim roll has an opportunity to act upon the end of the web. It has been repeatedly shown that this unsupported length of fabric is likely to tear off as a whole when the force of the rotating reclaim roll exceeds the strength of the fabric. The result of this tensioning and tearing is inconsistent separation of the fibers.

The use of a single feed roll/control plate system to introduce fiber to rotating rolls is a conventional system that was developed long ago to convey a consistent mat of individual fibers in which each fiber is essentially separate. Reclaiming nonwoven fabric, an application in which the fibers are either chemically bonded or mechanically interlocked posed a different set of problems, the most critical of which was the requirement that the entire width of fabric be uniformly controlled.

Uneven control of incoming stock results in the plucking of bunched fibers or pieces of fabric. This problem exists when processing individual fibers but is amplified when processing a whole fabric web because the fabric tends to act as a unit. In conventional fiber processing, uneven control will cause localized plucking but the individual fibers will separate and produce a small clump while leaving the rest of the mat undisturbed. Uneven control of one area of incoming fabric causes uneven processing of a very large area.

In addition to more holding power through greater surface area afforded by the feed system illustrated and described herein, the tension roll is preferably driven at a slightly slower speed to produce a stretching or drafting action between the two rolls. This additional tension provides still greater control over the incoming fabric, much the way stretching a piece of fabric tightly while cutting with scissors makes it easier to cut. By increasing the diameter of both rolls to provide greater stiffness more uniform holding force is achieved over the width of the machine. The resulting system is able to overcome most irregularities in the orientation, thickness, or weight of incoming fabric, thus allowing the feed system to adequately control the fabric against the force of the high speed opening roll.

Adjustable mounting brackets and bushing assemblies provide precise vertical and horizontal adjustment of both rolls. A locking bolt is provided at each adjusting point to secure the rolls once they have been properly positioned. It is thus possible to mount several small rolls closely together while still providing multi-axis adjustment.

Air Flow

Providing a continuous flow of high velocity air is desirable for moving fibers in such a way as to facilitate separation while avoiding choking of the air passageways. The continuous air stream is the only means by which processed fiber can exit the machine. The chamber or passageway through which the air and fiber passes must be carefully shaped so as to properly regulate air pressure and velocity. Experimentation has shown that improper profiles will result in clogging, reduced production capacity, and in extreme cases, actual machine damage due to fiber buildup.

The relationship between air velocity and pressure is important in efficiently evacuating processed fiber from the apparatus. The profile of the air chamber illustrated herein permits increase in the velocity with reduced air pressure as it is induced into the machine. The smallest cross sectional area, thus the highest velocity and lowest pressure, may be reached as illustrated at about the 6 o'clock position of the opening roll.

The increase in velocity at this zone beneath the opening roll results in a decrease in pressure. The theory is that the resulting low pressure area causes individual fibers to be drawn away from the reclaim roll and into the air stream, FIG. 6. This continuous process prevents the separated fibers from clumping together and clogging the air passage. If the velocity is allowed to drop and the low pressure area is lost, the fibers do in fact tend to regroup into clumps that cannot be carried away efficiently.

Figure 1:
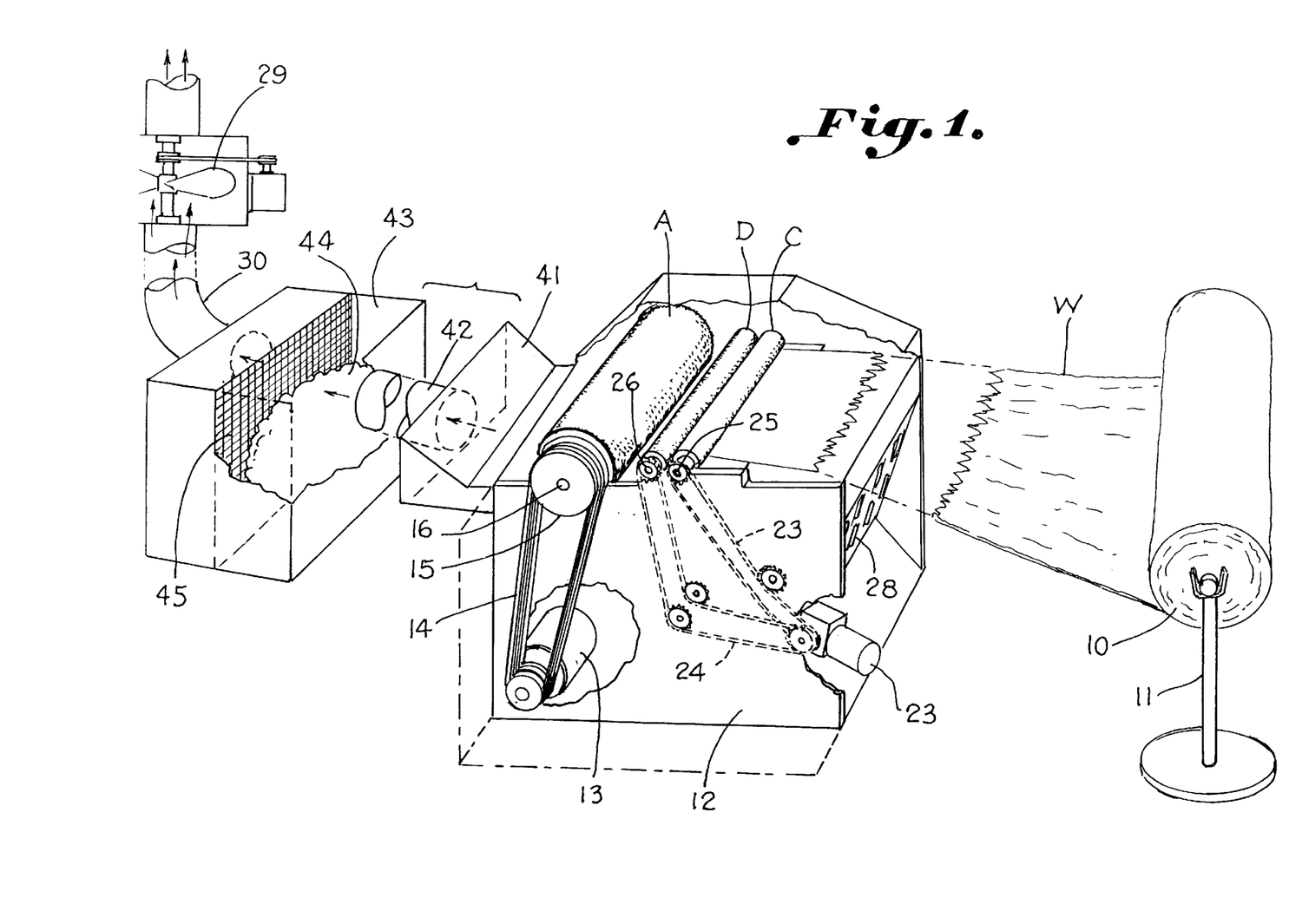
FIG. 1 is a schematic left front perspective view illustrating an apparatus and method for opening and reclaiming fibers according to the invention.
Figure 2:
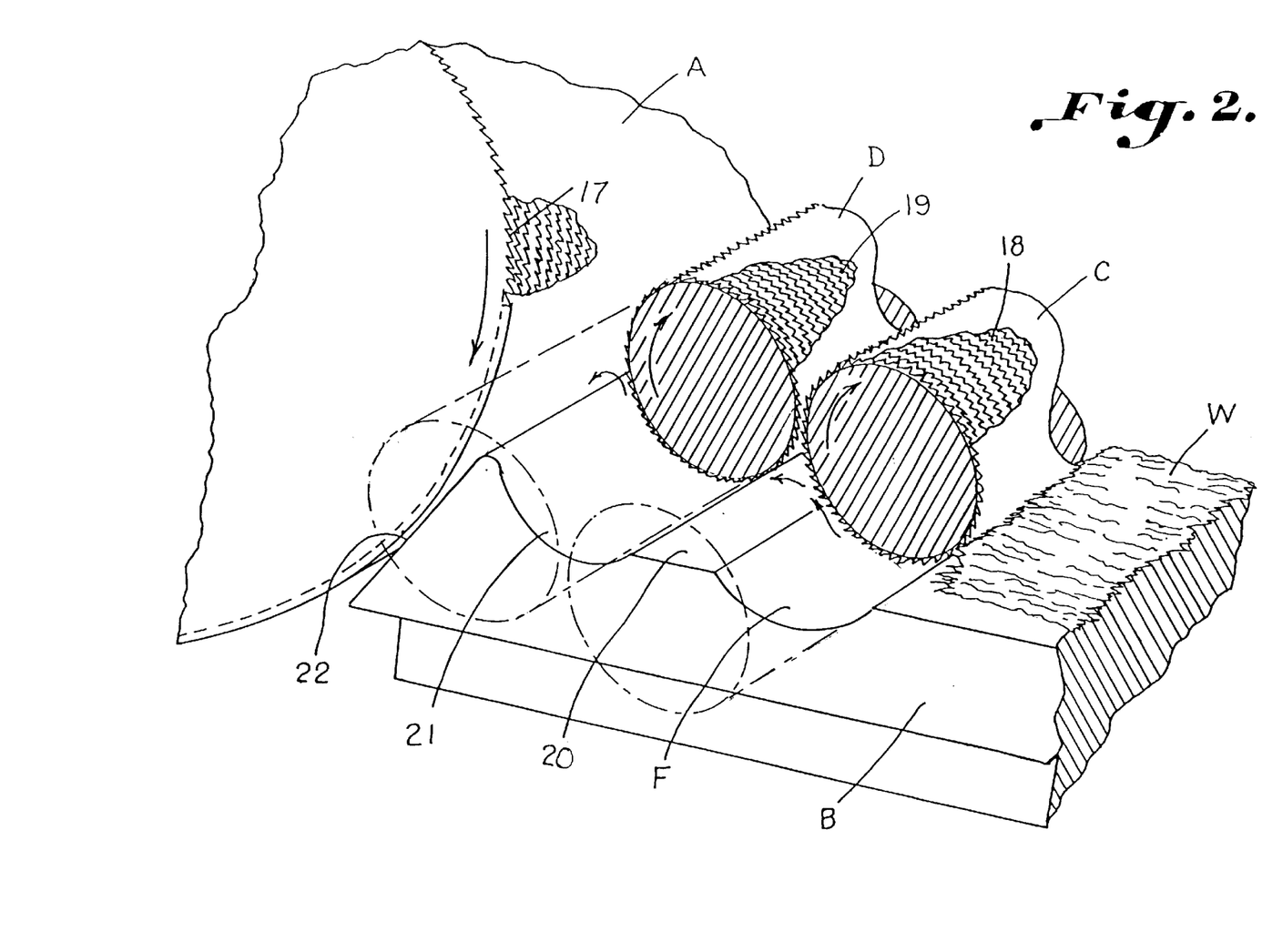
FIG. 2 is an enlarged perspective view with the feed rolls broken away illustrating a feed plate and feed roll assembly constructed in accordance with the invention wherein serially positioned feed rolls have increased contact area with the fibrous material passing into grooves beneath the feed rolls and thence to the opening roll.
Figure 3:
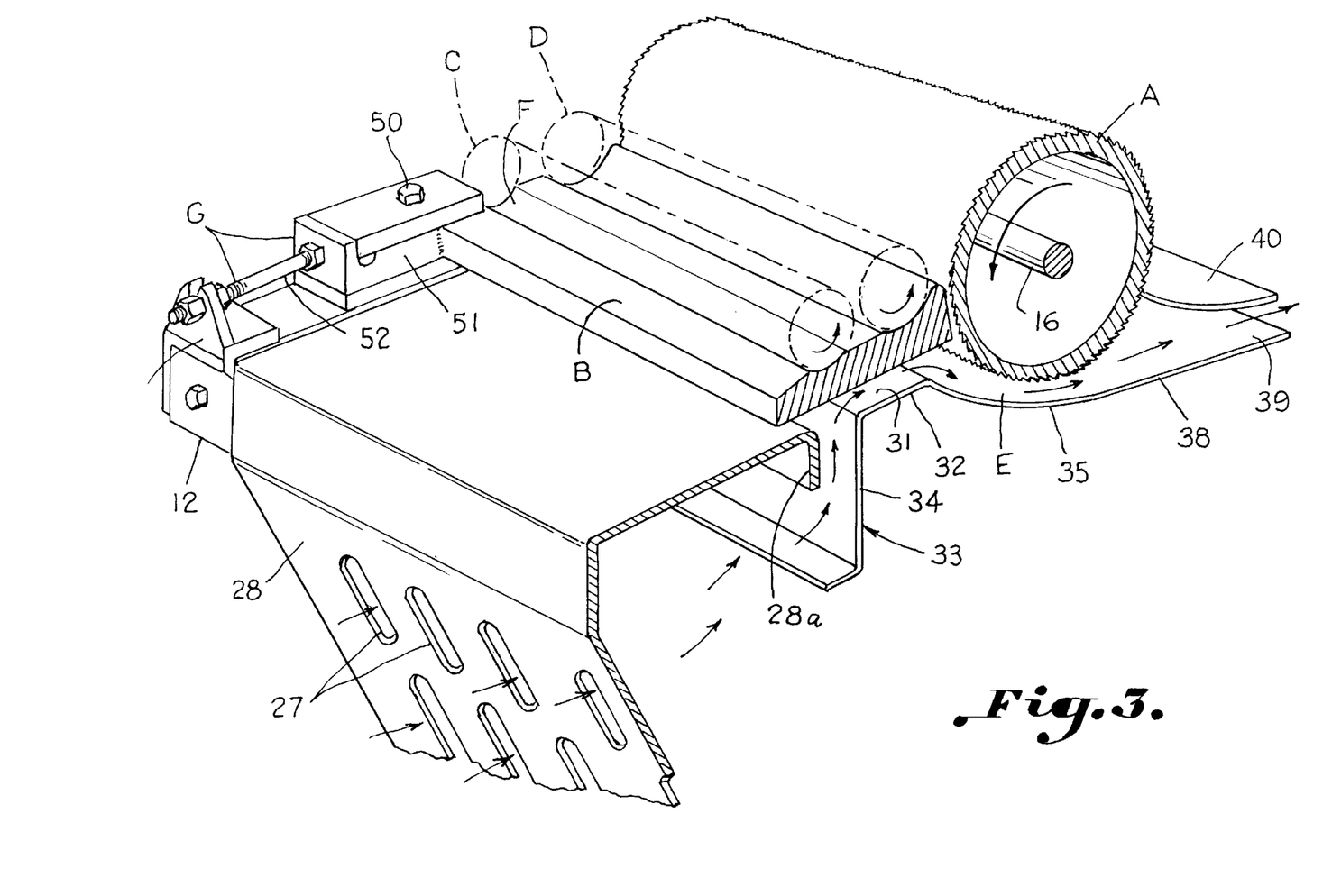
FIG. 3 is a perspective view at a reduced scale illustrating air flow passage and feed plate construction in accordance with the invention.

Referring more particularly to the drawings, FIG. 1 illustrates a roll of nonwoven fabric 10 carried on a suitable roll stand 11. The nonwoven fabric is unwound as a web W which is fed over the feed plate B into apparatus constructed in accordance with the invention. The components are carried in a suitable frame 12. A motor 13 is housed within the frame for driving the opening roll A as through the belt 14 which drives the pulley 15 carried on one end of a shaft 16 which supports the opening roll A. The opening roll A is best illustrated in FIGS. 2 and 3 as being clothed with suitable card clothing 17 although any other surface having teeth and the like may be utilized. FIGS. 2 and 3 also illustrate a feed plate B constructed in accordance with the invention which carries the feed rolls C and D. The feed roll C is illustrated as being provided with card clothing 18 while card clothing 19 is provided for clothing the roll D. The roll C is illustrated as being carried opposite a groove or trough F which presents a surface compatible with the opposing surface of the roll C. The feed plate has a flat bridging area 20 between the surface E and a like trough or groove 21 provided as by milling in the feed plate opposite the feed roll D. As observed herein, the closeness and adjustability of the settings between the feed rolls corresponding grooves and the nose 22 of the feed plate B in relation to the opening roll A are of special importance. Referring to FIG. 1, it will be noted that a motor 23 is provided with a suitable power takeoff for turning the feed rolls C and D through chains schematically illustrated as at 23 and 24 through suitable sprockets 25 and 26, respectively.

Air flow is introduced into the apparatus through perforations 27 in the plate 28 at a front end of the apparatus. Air is thus induced into the apparatus by a fan 29 carried in a suitable duct 30 as illustrated in FIG. 1. Air flow is illustrated in FIG. 3 as by the arrows which show passage of the air into a portion of the passageway illustrated at 31 beneath the feed plate B. The construction of an entrance portion of the air flow passageway is provided by a flat section 32 in a screen broadly designated at 33 for defining a lower portion of the air passageway E. The air moves upwardly between a depending portion 34 of the screen and a down turned flange 28a of the plate 28. The air flow then proceeds to a larger passageway portion directly beneath the transfer point at which the fiber passes over the nose of the feed plate to the tooth of the roll A. The passageway E includes a chamber formed by a curved portion of the imperforated screen as illustrated as at 35. The screen at the 6 o'clock position described above is then illustrated as proceeding in a substantially horizontal flat portion 38 to form the air outlet 39. The air outlet 39 is further constituted by a curved member 40 which extends outwardly from a cover 41 of the opening roll A. It will be observed in FIG. 1 that the air outlet 39 extends into a plenum 41 which connects through a duct 42 with a collection area 43 for the opened fibers 44. The vertical screen 45 is illustrated as containing the fibers as the air flow proceeds upwardly through the duct 30. The collection areas illustrated herein are standard and may assume any suitable conventional configuration.

Figure 4:
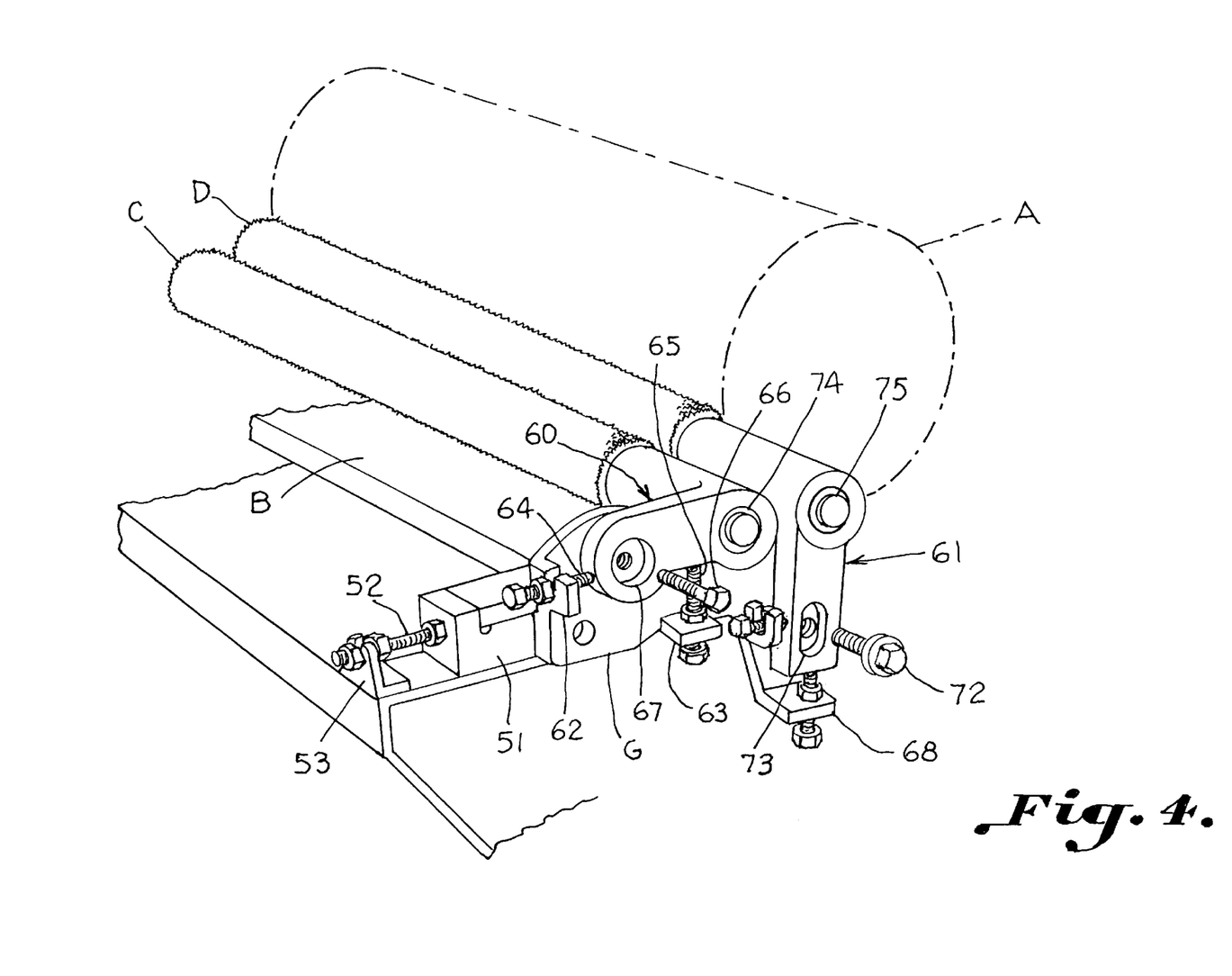
FIG. 4 is a right perspective view at a reduced scale illustrating mounting mechanism for the serially arranged feed rolls with parts broken away.
Figure 5:
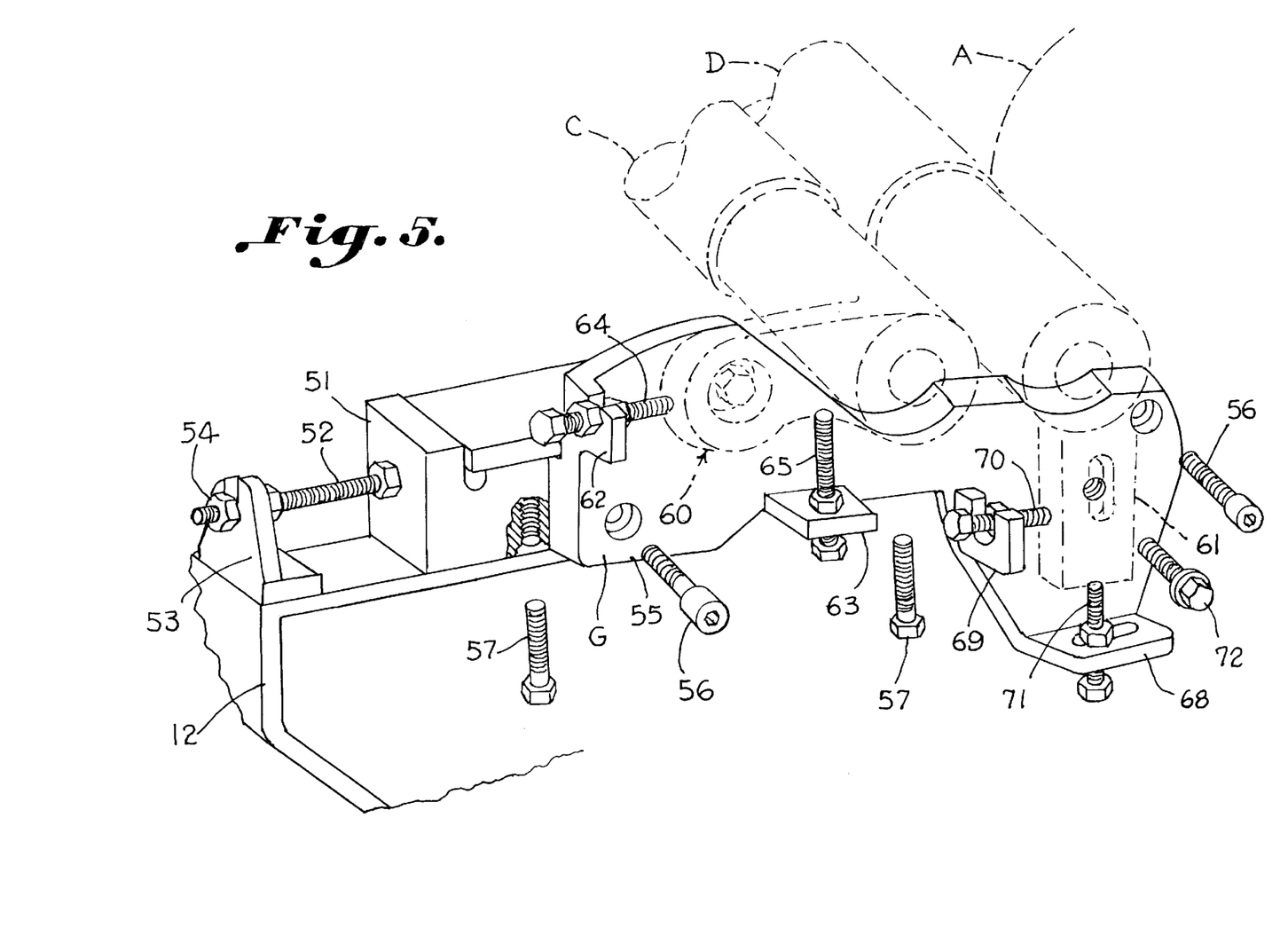
FIG. 5 is an enlarged perspective view further illustrating adjusting apparatus for setting the feed plate with respect to the opening roll as well as the spacing of the feed rolls with respect to one another, with respect to the respective grooves and with respect to the nose of the feed plate.

FIGS. 3, 4 and 5 illustrate an assembly for carrying the feed plate B and for adjusting the feed plate as well as the feed rolls C and D. The assembly is removably secured as by a bolt 50 to the frame 12 which carries the various components of the apparatus.

The assembly includes the end supports 51 of the feed plate B which carry a threaded adjustment member 52 within a bracket 53 supported by the frame 12. A nut 54 adjustably positions the threaded adjustment member 52 so as to secure the proper setting between the nose of the feed plate and the opening roll A. FIGS. 4 and 5 illustrate the adjustment mechanism G which further includes a mounting plate 55 which is secured by bolts 56 to the end supports 51 of the feed plate B. The end supports 51 are further secured as by bolts 57 to the frame 12.

The adjustment mechanism G in addition to the mechanism previously described for achieving the setting between the nose of the feed plate and the opening roll includes the bracket assemblies broadly designated at 60 and 61 for adjustably carrying the feed rolls C and D, respectively. The mounting plate 55 carries integral outwardly projecting bracket portions 62 and 63 for mounting threaded adjustment members 64 and 65, respectively, for adjusting the horizontal and vertical position of the feed roll C horizontally and vertically. The adjusted position is fixed by the threaded members 66 carried within the slots 67.

The plate 55 has additional outwardly projecting bracket members 68 and 69 for accommodating adjustable threaded members 70 and 71, respectively, for positioning the bracket 61 and the feed roll D carried thereby. The bolt 72 which extends through the slot 73 secures the adjusted position of the feed roll D with respect to the feed roll C and its opposing surface of the groove 21. The brackets 60 and 61 provide transverse bearings 74 and 75, respectively, at right angles to the extensions carrying the slots 67 and 73, respectively.

While a preferred embodiment of the invention has been described using specific terms, such description is for illustrative purposes only, and it is to be understood that changes and variations may be made without departing from the spirit or scope of the following claims.

What is claimed is:

1. Apparatus for reclaiming fibers from a textile web comprising:

a driven opening roll covered with card clothing;

a feed plate for receiving the textile web;

a pair of in line longitudinally and sequentially spaced feed rolls in direction of travel flow extending transversely of the feed plate for delivering the textile web to the opening roll for opening fibers contained in the web; and a passageway beneath the feed plate and the opening roll varying in cross section for providing air flow increasing in velocity with reduced air pressure for aiding in transporting fibers delivered from the feed plate beneath the opening roll.

2. The apparatus set forth in claim 1 including a transverse arcuate surface in the feed plate receiving a segment of a first of the feed rolls providing opposing surfaces between which the textile web passes for controlling the web on the way to a second feed roll from which the web passes over a nose of the feed plate to the opening roll.

3. The apparatus set forth in claim 2 including a second transverse arcuate surface in the feed plate opposite the second feed roll.

4. The apparatus set forth in claim 2 wherein the transverse arcuate surface is formed by milling.

5. The apparatus set forth in claim 1 wherein a feed system includes the feed plate and the feed rolls extending transversely thereof and being carried thereby; and including a pair of transversely spaced longitudinal threaded adjustment members for varying a setting between the feed system and the opening roll.

6. The apparatus set forth in claim 5 including an adjustable bracket assembly for rotatably positioning each respective end of a first feed roll on the feed plate, and threaded members adjusting each bracket assembly for adjustment in two directions at right angles to each other.

7. The apparatus set forth in claim 6 including an adjustable bracket assembly for rotatably positioning each respective end of each feed roll.

8. The apparatus set forth in claim 1 wherein said passageway is formed beneath the opening roll which serves as an upper boundary thereof and a screen member tapering progressively from a spaced position beneath the feed plate toward a lower periphery of the opening roll increasing the velocity of air flow induced therein for removing separated fibers from the opening roll and aiding in their transport out of the apparatus.

9. A feed system for delivering a fibrous mass to an opening apparatus comprising:

a pair of serially spaced driven feed rolls propelling said fibrous mass forwardly toward the opening apparatus;

a feed plate carried opposite said feed rolls over which the fibrous mass is propelled; and a transverse opening between a first of said driven feed rolls and said feed plate providing opposed surfaces for controlling the fibrous mass passing therebetween.

10. The feed system set forth in claim 9 including a drive rotating said first roll of said pair of feed rolls at a speed such that a retarding action is imparted to the fibrous mass passing therebeneath.

11. The feed system set forth in claim 10 including an arcuate groove in the feed plate opposite a lower surface of said first roll providing complementary surfaces for exerting a retarding action upon the fibrous mass passing therebetween.

12. The feed system set forth in claim 11 including a second arcuate groove in the feed plate opposite a lower surface of a second of said pair of feed rolls.

13. The feed system set forth in claim 12 including threaded means carried by each side of the feed plate adjusting each end of the feed rolls in two directions at right angles to each other.

14. Apparatus for opening fibers of a textile web comprising:

a driven opening roll;

a feed system by which a textile web is presented to the opening roll; and a chamber beneath the opening roll becoming progressively smaller in cross section from said feed system to a lower portion of the opening roll for creating a high velocity low pressure air flow zone for removal of fibers from the opening roll.

15. The apparatus set forth in claim 14 including:

an air outlet positioned in alignment with the chamber for inducing air flow in said air chamber adjacent the lower portion of the opening roll; and said air chamber increasing in cross section from said lower portion of the opening roll for transport of fibers removed from said opening roll.

16. The apparatus set forth in claim 15 including a continuously curving screen defining a lower boundary of the chamber uniformly increasing air velocity in an air stream induced in the air chamber extending beneath the opening roll.

17. The apparatus set forth in claim 14 wherein said feed system includes a feed plate and a pair of serially spaced feed rolls extending thereacross.

18. Mounting apparatus for multiple positioning serially spaced feed rolls for advancing a web comprising:

a feed plate having a transverse arcuate groove opposite at least one of said serially spaced feed rolls;

a mounting member carried by said feed plate adjacent each side thereof;

the mounting members including:

an adjustable mounting bracket and anti-friction member carrying each end of said at least one feed roll respectively for rotation and for adjustment in two directions at right angles to each other; and threaded members carried by said mounting member for effecting said adjustments.

19. The mounting apparatus set forth in claim 18 including means for adjusting the position of said feed plate in a direction in which said web is advanced.

20. The mounting apparatus set forth in claim 19 including a mounting plate on each side of said feed plate for adjustment in a horizontal plane;

a mounting for said mounting bracket on respective ends of said at least one feed roll; and an elongated arm extending at right angles thereto for adjustment in horizontal and vertical directions.

21. The mounting apparatus set forth in claim 20 including supports extending at right angles from said mounting plates threadably carrying threaded members for effecting said vertical and horizontal adjustments.

22. A method of opening fibers comprising the steps of:

delivering a fibrous mass to a first feeding zone delivering said fibrous mass to a second feeding zone from the first zone;

exerting a force advancing fibers of the mass in a second feeding zone spacing the first and second feed zones serially from one another;

supporting the fibers of the mass while advancing the fibers and thereby subjecting said fibers to the action of a rotating opening roll for exerting a separating action thereon; and removing said fibers from a surface of the opening roll.

23. The method of opening fibers set forth in claim 22 including the step of exerting a retarding force at said first feeding zone against said force advancing fibers of said mass.

24. The method of opening fibers set forth in claim 23 including driving a feed roll in said second feeding zone at a speed in excess of a speed at which a feed roll in said first feeding zone is driven.

25. The method of opening fibers set forth in claim 22 including the step of supporting said fibers as they pass over the nose of the feed to the opening roll.

26. The method of opening fibers set forth in claim 22 including the step of providing an arcuate surface opposite each said respective feed roll for controlling alignment of said fibers.

27. The method of opening fibers set forth in claim 22 including utilizing an air flow of increasing velocity beneath the opening roll to aid in separating opening fibers from the opening roll.

28. A method of opening fibers comprising the steps of:

feeding a fibrous mass over a feed plate to an opening roll covered with card clothing;

inducing a flow of air providing an air chamber becoming progressively smaller in cross-section from said feed plate to a lower portion of the opening roll in a stream beneath said feed plate and said opening roll;

progressively increasing the velocity of air flow to aid in removing fibers from said opening roll; and thereafter discharging said fibers removed from said opening roll in said air stream.

29. The method of opening fibers set forth in claim 28, further comprising the velocity of air flow is increased uniformly toward a zone of maximum velocity beneath the opening roll.

30. The method of opening fibers set forth in claim 28 further including the step of providing an exit passageway of increased cross sectional area after passage of air from said zone of maximum velocity.

\* \* \* \* \*